United States Patent [19]
Komatsu et al.

[11] 3,900,429
[45] Aug. 19, 1975

[54] CATALYST FOR PURIFYING EXHAUST GASES

[75] Inventors: Noboru Komatsu, Toyoake; Osami Kamigaito; Takatoshi Suzuki; Haruo Doi; Kazuya Sano; Nobuyuki Yamamoto; Toshio Kandori; Yukikazu Tsuzuki, all of Nagoya, Japan

[73] Assignee: Kabushiki Kaisha Toyota Chuo Kenkyusho, Aichi-ken, Japan

[22] Filed: Feb. 6, 1974

[21] Appl. No.: 440,021

[30] Foreign Application Priority Data
Feb. 14, 1973  Japan............................ 48-18112

[52] U.S. Cl............. 252/462; 252/465; 252/466 J; 252/469; 252/470; 252/474; 423/213.2; 423/213.5
[51] Int. Cl....................... B01j 11/06; B01j 11/22
[58] Field of Search.......... 252/462, 470, 474, 465, 252/469; 423/213.2, 213.5

[56] References Cited
UNITED STATES PATENTS

| | | | |
|---|---|---|---|
| 1,168,074 | 1/1916 | Hunter | 75/171 |
| 1,175,724 | 3/1916 | Driver | 75/170 |
| 1,393,375 | 10/1921 | Hunter | 136/241 |
| 1,992,325 | 2/1935 | Schaarwachter | 148/11.5 |
| 3,565,574 | 2/1971 | Kearby et al. | 252/474 X |
| 3,718,733 | 2/1973 | Gehri | 423/213.2 |
| 3,773,894 | 11/1973 | Bernstein et al. | 252/474 X |

OTHER PUBLICATIONS

Meijering et al., *A Miscibility Gap in the Face-Centered Cubic Phase of the Copper-Nickel-Chromium System,* J. Institute of Metals, Vol. 84, pp. 118-120, (1955-1956).

*Primary Examiner*—W. J. Shine
*Attorney, Agent, or Firm*—Oblon, Fisher, Spivak, McClelland & Maier

[57] ABSTRACT

A catalyst for purifying exhaust gases from internal combustion engines and the like which consists essentially of a particulate mixture of nickel particles and copper particles; nickel particles, copper particles and chromium particles; or nickel particles, copper particles, chromium particles and an oxide selected from the group consisting of yttrium oxide, titanium dioxide, lanthanum oxide and mixtures thereof, wherein said particulate mixture is sintered and at least partially oxidized.

18 Claims, 4 Drawing Figures

CATALYST FOR PURIFYING EXHAUST GASES

BACKGROUND OF THE INVENTION

1. Field of the Invention

The present invention relates to a catalyst for converting nitrogen oxides, carbon monoxide and hydrocarbons present in exhaust gases such as those which issue from internal combustion engines or the like to non-toxic or non-polluting materials. More particularly, the invention relates to a catalyst for converting nitrogen oxides to non-toxic components with efficiency.

2. Description of the Prior Art

Recently, atmospheric pollution has become a problem of increasing public concern. Thus, there has been an increasing demand for solutions to the problem of purifying the various kinds of exhaust gases which cause atmospheric pollution. Of particular concern is the problem of converting nitrogen monoxide and hydrocarbons which are deemed to be the cause of photochemical smog to nontoxic substances. Various methods have been proposed for remedying this problem. Various techniques have concentrated on the general approach of purifying the exhaust gases from the internal combustion engines of motor cars and other vehicles.

The composition of exhaust gases from the internal combustion engine, such as from a motor car using gasoline, varies with the engine running conditions such as idling, acceleration, deceleration, and the like. However, the composition of the exhaust gases generally consists of 11 to 15 vol % carbon dioxide gas, 11 to 15 vol % steam, 0.2 to 4 vol % oxygen, 0.2 to 8 vol % carbon monoxide, 0.4 to 4 vol % hydrogen, 0.06 to 0.006 vol % hydrocarbons such as methane, propane and the like, 0.1 to 0.3 vol % nitrogen oxides (the majority thereof being nitrogen monoxide) and the balance nitrogen. Among these components, carbon monoxide, hydrocarbons and nitrogen oxides are considered the toxic components, and efforts have been made to convert the gaseous components into non-toxic materials to minimize the amount of toxic components discharged into the atmosphere. In converters using the catalysts of the present invention, the conversion of gaseous components is achieved by converting carbon monoxide and hydrocarbons into carbon dioxide and water by oxidation. Further, these converters convert nitrogen oxides to nitrogen and oxygen by reduction, and subsequently use the oxygen obtained to oxidize the carbon monoxide to carbon dioxide.

While catalysts have been developed which are useful for the oxidation of exhaust gas components, no catalysts have been developed which are satisfactory as reduction catalysts for the conversion of nitrogen oxides.

The catalysts which have been proposed for the conversion of the toxic components in exhaust gases include palladium, platinum, platinum plus palladium and platinum plus rhodium on suitable carriers such as alumina. These catalysts are very efficient oxidation catalysts. However, these catalysts suffer from the disadvantage that, although the catalysts apparently decompose the nitrogen oxides by a reductive reaction, the catalysts partly convert the nitrogen oxides into ammonia, thus failing totally to purify the exhaust gases. In other words, the ammonia produced as a by-product is discharged into the atmosphere, otherwise the ammonia is oxidized again to nitrogen monoxide when the exhaust gases pass through the oxidation catalyst layer which is used to oxidize carbon monoxide and the hydrocarbons in the exhaust gases. Thus, the nitrogen monoxide is discharged into the atmosphere as a pollutant.

The amount of nitrogen monoxide produced in the exhaust gases of a motor car depends on the operating conditions of the engine. When the air/fuel ratio is increased at the high operating speeds of an engine, an increase in the amount of nitrogen monoxide results. Also, an excessive amount of oxygen is contained in the exhaust gases over that amount which is required to completely burn the components which have not been completely burned. Then, the oxygen ratio (which will be described in detail hereinafter) ranges from 100 to 200%. In this respect, such high levels of oxygen apparently are an obstacle for the conversion of nitrogen monoxide to non-toxic components. Thus, there are difficulties in developing catalysts useful for the conversion of nitrogen monoxide even under these circumstances.

A need, therefore, continues to exist for a method of converting the nitrogen oxides present in exhaust gases to non-toxic components efficiently even at high air/fuel ratios and at the same time minimizing the production of ammonia.

SUMMARY OF THE INVENTION

Accordingly, one object of the present invention is to provide a catalyst which purifies exhaust gases from internal combustion engines and the like.

Another object of the present invention is to provide a catalyst which converts nitrogen oxides present in the exhaust gases to non-toxic components.

Yet another object of the invention is to provide a catalyst which exhibits a high NO conversion rate even at high air/fuel ratios and which does not promote the formation of ammonia as a by-product.

Briefly, these objects and other objects of the invention as hereinafter will become more readily apparent can be attained by providing a catalyst for purifying exhaust gases from internal combustion engines and the like which consists essentially of a particulate mixture of nickel particles and copper particles; nickel particles, copper particles and chromium particles; or nickel particles, copper particles, chromium particles and an oxide selected from the group consisting of yttrium oxide, titanium dioxide, lanthanum oxide and mixtures thereof, wherein said particulate mixture is sintered and at least partially oxidized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In one embodiment of the invention, a sintered, catalyst is prepared by sintering a mixture of nickel particles and copper particles under partial oxidation conditions. The shape of the catalyst material can be beads, granules, pellets, plates, a honeycomb structure or the like. The catalyst thus obtained promotes the efficient conversion of nitrogen oxides to non-toxic materials without the attendant by-production of ammonia as well as the conversion of carbon monoxide and hydrocarbons.

The catalyst of the present invention exhibits great mechanical strength and hence great mechanical durability because the catalyst is a sintered body consisting of metal particles. Also, the catalyst structure is a porous, sintered material which results in a catalyst with a large surface area and hence possesses a high purifying or converting activity per unit volume of the catalyst.

The catalyst of the present invention is prepared by adding chromium particles to a combination of nickel particles and copper particles. This catalyst is a somewhat better catalyst for the conversion of nitrogen oxides to non-toxic components than the aforesaid nickel-copper catalyst of the invention, while it retains the advantages of the nickel-copper catalyst.

In the sintered catalyst of the invention which consists of nickel and copper particles (hereinafter referred to as a Ni-Cu sintered catalyst), nickel particles and copper particles are uniformly dispersed in the mixture when mixed. The particles bond together at their mutually contacting surfaces when the particles are sintered. In this respect, the metallic particles of the sintered catalyst body remain as discrete metallic particles of nickel and copper just as the particles existed before sintering. It is only in those areas where bonding occurs at the mutually contacting surfaces of the particles that a nickel-copper alloy forms which bonds the particles together. Furthermore, the sintered catalyst obtained is porous, and the surfaces of the particles are partially oxidized.

In preparing the catalyst of the invention, nickel particles and copper particles are mixed together, and the mixture thus prepared is placed in a container which is stable at high temperatures, such as a ceramic container and heated to a temperature of 500° to 1000°C in air. It follows that the particles of the two metals are bonded or sintered together, and the surface of the resultant sintered body is partially oxidized, because of heat treatment in air.

The particles of the catalyst can be sintered by a variety of methods. One method involves simply placing a mixture of the particles in the aforesaid container and heating the container. Another method involves placing a mixture of the particles in a metal die or the like, and pressing the particles into a porous, compact plate or lump shaped body and then heating the same. Yet another method involves kneading a mixture of the particles into a paste with an aqueous solution of polyvinyl alcohol forming beads, granules, plates, pellets, or a honeycomb structure of the paste by conventional methods and then heating the paste mixture. The binder material of the paste is lost upon sintering.

In the instance when the aforesaid sintering step is conducted under a non-oxidative atmosphere, such as hydrogen, nitrogen or the like, the sintered body is again heated to 500° to 1000°C in air to partially oxidize the sintered body. In addition, when the sintered body is in the shape of a lump, it is preferably crushed until particles of a grain size of from 2 to 5 mm in diameter are obtained as shown in the Examples of the invention which will be described later. The granulated catalysts are then ready to be loaded into the catalytic (gas purifying) converter.

In one embodiment of the invention, the porous sintered catalyst body, a portion of which has been oxidized, is subjected to the following activating treatment whereby a catalyst is obtained which has a purifying activity of 1.2 to 1.5 times greater than those catalysts which are not activated. The activating treatment is conducted by heating the sintered catalyst at a temperature of 500° to 1000°C for one to two hours in a reductive gas such as carbon monoxide, hydrogen or the like, or in a non-oxidizing gas which consists of 0.5 to 5% by volume of one of the reductive gases with the balance being nitrogen.

The catalyst of the invention which involves a mixture of nickel, copper and chromium particles (hereinafter referred to as a Ni-Cu-Cr sintered catalyst) is partially oxidized upon sintering and is also porous. As in the sintered Ni-Cu catalyst, the metallic particles of nickel, copper and chromium are bonded or sintered together. The Ni-Cu-Cr catalyst is prepared by mixing particles of the three metals together and sintering the mixture as in the case of the aforesaid Ni-Cu catalyst. After sintering, the Ni-Cu catalyst can also be activated. In addition, if one of more particles of yttrium oxide, titanium dioxide or lanthanum oxide are added to the mixture of nickel, copper and chromium particles, and then the particles are sintered, a catalyst is obtained which has improved purifying characteristics relative to carbon monoxide.

When formulating the sintered Ni-Cu catalyst of the invention, it is preferable that the amount of nickel particles range from 50 to 95% by weight, while the amount of copper particles ranges from 5 to 50 wt %. If the amount of nickel particles is outside of this range, the resulting catalyst will have reduced effectiveness for the purification of nitrogen oxide contaminants in exhaust gases. With the sintered Ni-Cu-Cr catalyst, the sum of the nickel particles and the chromium particles should preferably range between 50 and 95% for the same reason as above. The balance of the composition is 5 to 50% copper.

When the sintered Ni-Cu-Cr catalyst contains one or more particles of yttrium oxide, titanium dioxide or lanthanum oxide, the Ni-Cu-Cr content of the catalyst should preferably be in the range from 95 to 99% by weight and the content of the oxide(s) should be in the range from 1 to 5 wt %. If the oxide content of the Ni-Cu-Cr catalyst is less than 1% by weight, the resulting catalyst will not possess the desired advantages or efficiency. On the other hand, if the oxide(s) content of the catalyst is in excess of 5% by weight, the ability of the catalyst to remove nitrogen oxides from the exhaust gases is decreased.

For each of the catalysts of the invention, the diameter of the particles of the starting materials should preferably range from 2μ to 2 mm. The smaller the grain size, the greater will be the purifying characteristics. However, if the grain size is less than 2μ, the expense for preparing particles of this size is increased, while grain sizes larger than 2 mm will materially lower the purifying characteristics. With either type of catalyst, it is preferable that the porosity of the catalyst be in the range from about 20 to 40%, from the viewpoint of mechanical strength and purification characteristics. Furthermore, it is essential for either catalyst, that at least a portion of the sintered catalyst body be oxidized. However, the catalysts may be oxidized with the oxygen present in the exhaust gases as well. It follows then that the catalyst does not have to be oxidized prior to being loaded or charged into the converter for the purification of exhaust gases. Although it is preferable that the catalysts be activated by the previously mentioned activating treatment in order to achive a high level of purification of exhaust gases commencing from the initial phases of use of the catalyst, the catalyst may be activated with the carbon monoxide present in the exhaust gases, when a converter containing the catalysts for purifying exhaust gases is placed in an automobile.

The common feature of the catalysts presently described is that particles of the starting materials are mixed together and then subjected to sintering, which results in material bonding of the particles. It should be recognized that the particles which constitute the sintered catalyst body of the present invention exists as discrete metallic particles. The catalyst is not composed of a series of mutually bonded particles wherein each particle is a nickel-copper or nickel-copper-chromium alloy. The only portions of the present catalyst structure where alloy structure exists is in the regions where the particles are mutually bonded. This is the point where the sintered catalysts of the present invention are distinguished from the normal or conventional sintered alloy catalyst structures or the Monel (registered trademark) catalyst as shown in the Examples. In these catalysts, mixtures of the metallic components exist on an atomic scale and not a particle scale. The conventional alloy catalysts possess lower purification characteristics than the catalysts of the present invention (see Examples). More particularly, the catalysts of the present invention exist as sintered bodies, in which a mixture of nickel particles, copper particles with or without chromium particles are sintered in a manner such that, in contrast to alloy catalysts, the catalyst components exist in the form of a mixture of relatively large particles or granules. In this manner, each component or particle or granule independently or individually contributes to the purification activity of the catalyst. It is also believed that a unique form of catalytic activity occurs at the bonding alloy sites between the catalyst particles. Thus, it is believed that the excellent purification characteristics of the present catalysts stem from the unique catalyst structure heretofore elucidated. The degree of purification obtained heretofore has been unattainable with conventional alloy catalysts.

The catalysts of the present invention may not only be used for converting the nitrogen oxides present in exhaust gases from the internal combustion engine of a motor car or the like, but also from nitric acid plants or the like.

Having generally described this invention, a further understanding can be obtained by reference to certain specific examples which are provided herein for purposes of illustration only, and are not intended to be limiting unless otherwise specified.

Figure 4:
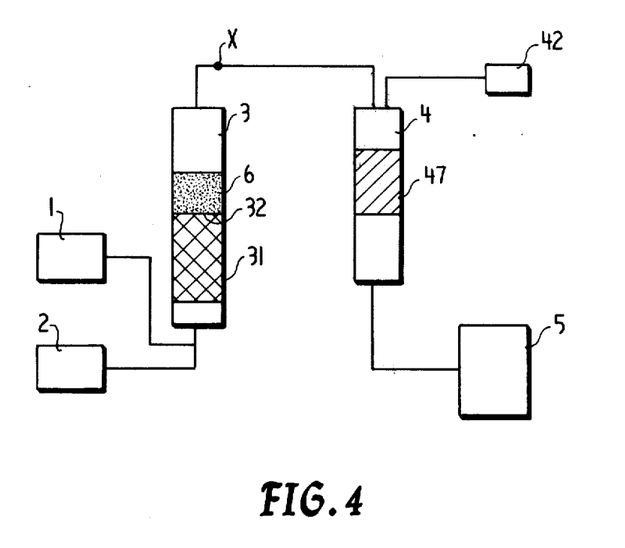
FIG. 4 is a flow diagram of the apparatus used to measure the conversion rates for various components of exhaust gases.

The method of measuring the conversion of the gaseous components in Examples 1 to 3 is as follows:

As shown in the flow sheet of FIG. 4, the conversion rate measuring apparatus consists of a model gas bomb 1 into which the model gas to be purified is charged, an oxygen bomb 2 which contains oxygen for use in adjusting the amount of oxygen in the system, a converter 3 connected by pipes to the bombs 1 and 2, an oxidizing tower 4 connected by pipes to the converter 3, and an analyzer 5 connected by a pipe to the oxidizing tower 4, the analyzer being adapted to measure the concentration of the unconverted nitrogen monoxide. Furthermore, the aforesaid oxidizing tower 4 used in the oxidation reaction is connected to an oxygen bomb 42. The converter 3 is a quartz cylinder which has an inner diameter of about 22 mm, within which is placed from bottom to top, preheating layer 31 consisting of silicon carbide beads, a thin layer 32 of glass fibers and a layer 6 of the catalyst of the present invention. The oxidizing tower 4 which is filled with a Pt-Rh catalyst 41 serves to oxidize the ammonia which has been produced in the converter 3 to nitrogen monoxide with oxygen from the oxygen bomb 42. By arranging the oxidizing tower 4 in the above-indicated manner, it is possible to measure the amount of nitrogen monoxide which has been actually removed by the converter 3, as will be described hereinafter.

For the measurement of the conversion rate, the preheating layer 31, the catalyst-filled layer 6 in the converter 3, and the catalyst 41 in the oxidizing tower 4 are heated and maintained at the desired temperatures by means of a heating source (not shown) placed externally thereof. Subsequently, the model gas from the model gas bomb 1 and the oxygen gas from the oxygen gas bomb 2 are mixed and introduced into the converter 3 and the flow rates thereof are adjusted. The gases thus introduced into the converter are heated to a converting temperature in the preheating layer 31, and then are passed into the catalyst-filled layer 6 in which the nitrogen monoxide is converted. The gas from the converter 3 then enters oxidizing tower 4, wherein the by-product ammonia in the gas is completely converted into nitrogen monoxide. The gas from oxidizing tower 4 then enters the analyzer 5, wherein the concentration of the nitrogen monoxide present in the gas is measured. In this respect, the amount of nitrogen monoxide detected at the analyzer 5 is the amount of nitrogen monoxide which has not been converted in the converter 3. Before passing the gas to be analyzed into the analyzer, the gas is confirmed to be freed of any non-oxidized ammonia by passing the gas through Nessler's reagent.

The model gas as used herein consists by volume of 800 ppm of nitrogen monoxide (NO), 500 ppm of propane ($C_3H_8$) as the hydrocarbon component, 1% carbon monoxide (CO), 1% hydrogen ($H_2$), 10% water ($H_2O$) and the balance of nitrogen ($N_2$). The composition of the toxic components in the model gas approximates the composition of the toxic components in the exhaust gases which are evolved from the motor car.

The volume (apparent volume) of each catalyst used is shown in each Example. The space velocity during the measurements was 5500/hr and the catalyst temperature is shown in each Example. As has been described, the oxygen ratio is varied by varying the amount of oxygen supplied from the oxygen bomb 2. Thus, the relationship of the oxygen ratio to the conversion rate can be measured. The oxygen ratio as used herein is defined as the value (%) obtained from the formula:

100× [total amount of oxygen (To)/the theoretical amount of oxygen (Th)]

The total amount of oxygen (To) represents the total amount of oxygen in the gas mixture supplied to the converter 3. The theoretical amount of oxygen (Th) denotes the amount of oxygen which is supplied to the model gas completely to oxidize the $C_3H_8$ and the CO in the model gas. In addition, the conversion rate as used herein signifies the amount of NO in the gas mixture converted into non-toxic components such as nitrogen, oxygen and the like, i.e., the conversion rate is represented by the value (%) obtained from the formula:

$$100 \times (V_o - V_1)/V_o,$$

wherein $V_o$ represents the amount of NO in the gas mixture and $V_1$ the amount of NO detected in the analyzer 5.

The conversion rates as shown in each Example represent the values obtained as the oxygen ratios are increased during the measurements.

EXAMPLE 1

Two Ni-Cu catalysts containing different amounts of nickel and copper were prepared.

Nickel (Ni) particles and copper (Cu) particles were mixed together in the quantities shown in Table 1. Each mixture prepared was separately placed in a ceramic container which was sintered while exposed to air at a temperature of 700°C for 2 hours. The sintered materials obtained were crushed until particles of a grain size of about 3 to 4 mm in diameter were obtained. The porosity of the granular sintered bodies was found to be about 40%. Meanwhile, the grain sizes of the aforesaid starting particles were in the range from 20 to 200μ.

Subsequently, the granular sintered catalyst materials thus prepared were heated for activation at 700°C for 1 hour under an atmosphere consisting of 1% by volume of carbon monoxide and the balance nitrogen. Thereafter, 20 cc portions of a granular sintered catalyst material were loaded or charged into a converter 3, and the NO conversion rates were measured at 500°C at varying oxygen ratios.

The test results are shown in Table 1. The NO conversion rates attained using each of the catalysts shown in Table 1 versus oxygen ratio are illustrated in FIG. 1, wherein curves $a$ and $b$ show the results obtained for catalyst samples 1 and 2 respectively.

TABLE 1

| Sample No. | Composition (wt%) | | NO conversion rate (%) Oxygen ratio | | | Reference character of curve |
|---|---|---|---|---|---|---|
| | Ni | Cu | 50% | 100% | 150% | |
| 1 | 70 | 30 | 100 | 100 | 93 | a |
| 2 | 95 | 5 | 98 | 95 | 85 | b |

Figure 1:
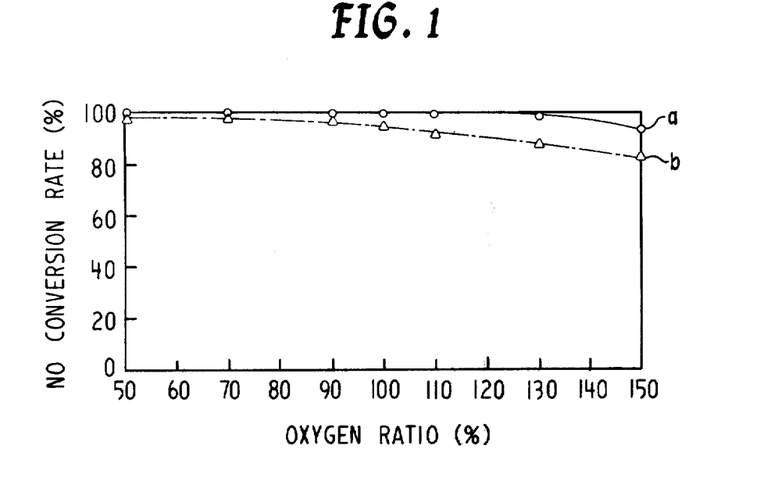
FIGS. 1 and 2 are graphs which illustrate the NO conversion rates versus oxygen ratio as a function of the catalysts of Examples 1 and 2.

As can be seen from Table 1 and FIG. 1, the above Ni-Cu sintered catalyst materials exhibit high NO conversion rates even at a high oxygen ratio.

EXAMPLE 2

A Ni-Cu-Cr catalyst was prepared by the following procedure: 65% weight of nickel particles, 15% copper particles and 20% chromium particles were mixed together and the mixture thus prepared was sintered at 700°C in air as described in Example 1. Thereafter, the sintered catalyst material was crushed to a grain size of about 4 mm in diameter. The porosity of the sintered material was about 40%. The granular, sintered material was activated as described in Example 1, and thereafter, the NO conversion rates were measured using 20 cc of the prepared sintered Ni-Cu-Cr catalyst material at 500°C. The test results are shown in Table 2. The grain size of the catalyst material used was in the range from 20 to 200μ. Table 2 compares the results of measurements of the NO conversion rate using a conventional Ni-Cu-Cr alloy ($C_1$) and a conventional Ni-Cu alloy ($C_2$) with the results obtained from the Ni-Cu-Cr catalyst (sample 3) of the present invention. The Ni-Cu-Cr alloy catalyst ($C_1$) was prepared by mixing 65% nickel, 15% copper and 20% chromium, and then heating the mixture until molten whereby an alloy was obtained which was cut into small narrow pieces of about 0.5 mm thick, 2 to 5 mm wide and 10 to 20 mm long. The Ni-Cu-Cr alloy catalyst material was then sintered at 700°C for 2 hours in air and then activated in order to provide preparative conditions for the alloy material similar to those used for the catalysts of the present invention prior to the measurement of the NO conversion rate. The Ni-Cu alloy catalyst (referred to as Monel metal) was prepared by mixing 70% by weight of metallic nickel and 30% by weight of copper and then heating the mixture until molten whereby an alloy was obtained. The alloy was cut into small narrow pieces similar to the Ni-Cu-Cr alloy catalyst. Thereafter, as with the Ni-Cu-Cr alloy catalyst material, the Ni-Cu alloy catalyst material was sintered in air and activated.

Figure 2:
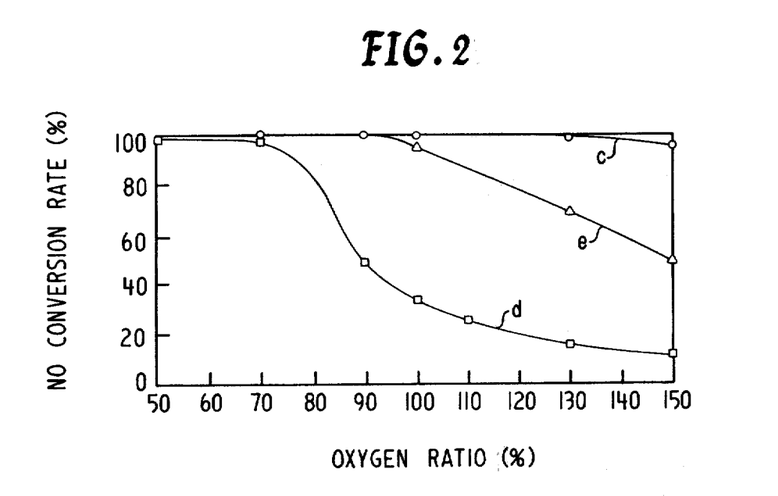

The results of the tests are shown in FIG. 2 by the curves, wherein the reference characters $c$, $d$ and $e$ represent the curves obtained for catalysts samples 3, $C_1$ and $C_2$ respectively in Table 2.

TABLE 2

| Sample No. | Types of catalysts | NO conversion rate Oxygen ratio | | | | | Reference character of curve |
|---|---|---|---|---|---|---|---|
| | | 50% | 90% | 100% | 130% | 150% | |
| 3 | Ni-Cu-Cr catalyst of the invention | 100 | 100 | 100 | 98 | 95 | c |
| $C_1$ | Ni-Cu-Cr Alloy | 98 | 50 | 33 | 16 | 12 | d |
| $C_2$ | Ni-Cu Alloy | 100 | 100 | 94 | 68 | 48 | e |

As can be seen from Table 2 and FIG. 2, the Ni-Cu-Cr catalyst (Sample No. 3) of the present invention exhibits an NO conversion rate equal to or greater than the conversion rate exhibited by the sintered Ni-Cu catalyst of the present invention. In contrast thereto, the Ni-Cu-Cr alloy catalyst (No. $C_1$) which is of the same composition as that of Sample No. 3 but in the form of an alloy, exhibits a comparatively low NO conversion rate. Also, the Ni-Cu alloy catalyst (No. $C_2$) exhibits an NO conversion rate lower than that obtained for the sintered Ni-Cu-Cr catalyst of the present invention as well as the sintered Ni-Cu catalyst materials of Example 1 and FIG. 1.

EXAMPLE 3

As shown in Table 3, nickel particles, copper particles and chromium particles were mixed in the various amounts shown. Each mixture was sintered in the same manner as described in Example 2, after which the sintered materials obtained were crushed to a grain size of about 4 mm and subjected to the activating treatment described in Example 1. Measurements were taken for the NO conversion rate at 500°C using 20 cc portions of the catalysts thus prepared. The results are shown in Table 3. The values for Sample No. 3 are the same as shown in Table 2.

TABLE 3

| Sample No. | Composition (wt %) | | | NO conversion rate (%) Oxygen ratio | | | |
|---|---|---|---|---|---|---|---|
| | Ni | Cu | Cr | 50% | 100% | 130% | 150% |
| 4 | 80 | 10 | 10 | 99 | 97 | 95 | 94 |
| 3 | 65 | 15 | 20 | 100 | 100 | 98 | 95 |
| 5 | 50 | 20 | 30 | 100 | 100 | 100 | 98 |
| 6 | 35 | 25 | 40 | 100 | 96 | 88 | 79 |

As is clear from Table 3, all of the catalysts containing varying amounts of Ni, Cu and Cr show high NO conversion rates.

EXAMPLE 4

Measurements were taken for NO conversion rates of exhaust gases from an automobile using gasoline fuel, which had passed over a sintered catalyst of 65% Ni-15% Cu-20%. Cr. The measuring procedure used was the same as described in Examples 1 to 3. (The Examples hereinafter also followed the same procedure.) More specifically, 20 cc of the Ni-Cu-Cr catalyst was loaded into the converter 3. The converter was mounted onto an automobile with the gas inlet pipe thereof being open to the inner wall of the exhaust pipe, in a manner that a portion of the exhaust gases entered the converter. The NO conversion rates were measured at varying air/fuel ratios for the automobile engine. The air/fuel ratio used herein is defined as the ratio of air to gasoline, by weight. The theoretical air/fuel ratio in the present instance using gasoline was 14.7.

It should be noted that the catalysts used consisted of metal particles having three different grain sizes, and measurements were obtained for each of the three catalysts. The catalysts were sintered in a non-oxidative atmosphere, oxidized in air and subjected to the activating treatment. The temperature of the catalysts when measured was 500°C, and the space velocity of the exhaust gas thereof was 30,000/hr. Table 4 shows the grain sizes of the catalysts, their porosities and the NO conversion rates.

TABLE 4

| Sample No. | Particle size diameter (μ) | Porosity (%) | NO conversion rate (%) Air/fuel ratio | | | |
|---|---|---|---|---|---|---|
| | | | 13 | 14 | 14.7 | 15.5 |
| 7 | 2–10 | 30 | 92 | 95 | 95 | 90 |
| 8 | 20–200 | 40 | 80 | 78 | 70 | 42 |
| 9 | 1000–2000 | 45 | 65 | 53 | 37 | 20 |

The catalyst of Sample No. 8 is the same as the catalyst of Sample No. 3 in Example 2. However, as can be see from Table 4, the catalyst exhibits an NO conversion rate as high as about 70% for a theoretical air/fuel ratio of 14.7 even under the severe conditions presented by the exhaust gases which issue from the automobile engine. In terms of grain size, it is clear from the data of Table 4 that the smaller the grain size, the higher the NO conversion rate.

EXAMPLE 5

Measurements were obtained for the conversion rates of NO, carbon monoxide (CO) and hydrocarbons present in exhaust gases as described in Example 4 for various catalysts of the present invention.

The measuring procedure used was under substantially severe conditions for the examination of catalyst activity on the exhaust gases issuing from an automobile. Stated in more detail, the catalyst was first loaded into a cylindrical converter, and then an exhaust gas at a temperature of about 500°C or 400°C from a gasoline engine was admitted into a catalyst maintained at room temperature. The catalyst was heated by the heat of exhaust gases as well as by the heat of reaction produced by the oxidation of the combustible components in the gases promoted by the action of the catalysts. The conversion rates were then measured each time after an exhaust gas was passed into the converter. This type of measurement is important for the evaluation of initial activity of the catalyst when the engine is cold-started. Meanwhile, the conversion rate of the catalyst when the catalyst reaches a constant maximum temperature is defined as that conversion rate which represents the conversion rate of the catalyst at the exhaust gas temperature. The measurements were conducted with a converter which had an inner diameter of 30 mm, contained 20 cc of catalyst, and had a space velocity of 60,000 (1/hr) and an air/fuel ratio of 14. The conversion rates of CO and hydrocarbons (HC) were calculated in a manner similar to that used for determination of the NO conversion rates by using concentrations of those gases ahead or behind the catalyst converter 3.

Figure 3:
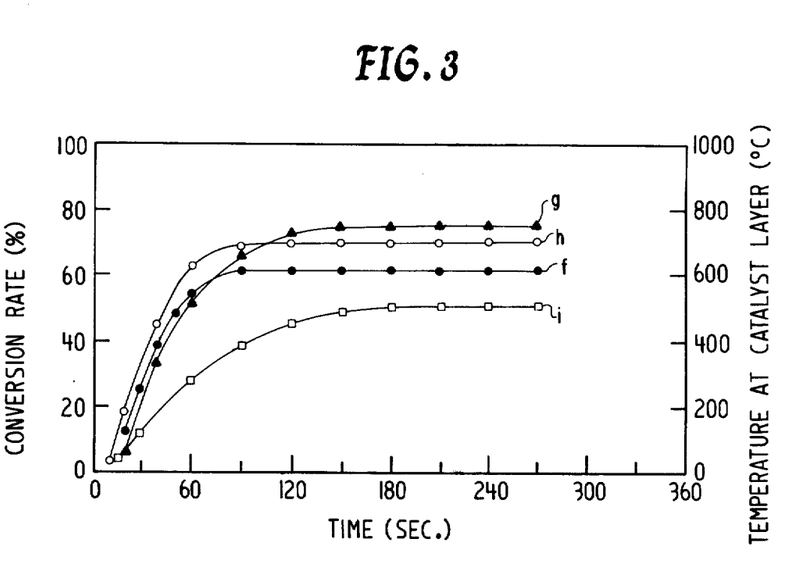
FIG. 3 is a graph which shows the variation of temperature and the conversion rates of NO, CO and hydrocarbons versus time which commences with the introduction of an exhaust gas over the catalyst of Sample No. 10 in Example 5.

Table 5 lists the types of catalysts used for the conversion measurements, and the results thereof. FIG. 3 shows the results of measurements for catalyst Sample No. 10, in which the time (sec.) after commencing the introduction of the exhaust gases is shown on the abscissa, while the respective conversion rates (%) and temperature (°C) are presented on the two ordinates. The curve represented by the reference character $f$ shows the catalyst temperature as a function of time. The conversion rates for NO, CO and HC are represented by the curves marked with reference characters, $g$, $h$ and $i$, respectively.

The catalyst of Sample No. 10 in Table 5 was prepared as described in Example 1, while Sample Nos. 11 to 13 were prepared as described in Example 2, with the compositions thereof being varied as shown in Table 5. The catalysts were activated as previously described. Sample Nos. 14 to 16 were prepared by mixing yttrium oxide ($Y_2O_3$), titanium dioxide ($TiO_2$) and lanthanum oxide ($La_2O_3$) particles (grain size of 5 to $10\mu$) separately with Ni, Cu and Cr particles. Each Ni-Cu-Cr-oxide mixture thus prepared was subjected to the subsequent procedures used in the preparation of the sintered Ni-Cu-Cr catalyst of Example 2, including a similar activation treatment.

The conversion rates in Table 5 of Sample Nos. 10 to 12 represent the values obtained when exhaust gases at 500°C wre introduced over the catalyst while the conversion rates of Sample Nos. 13 to 16 represent the values obtained when exhaust gases at 400°C were introduced over the catalyst.

tures to be measured. Sample No. 13 which was the same catalyst as Sample No. 11 exhibits an NO conversion rate close to 40%. This means that the catalyst maintains a conversion rate as high as 40% even at temperatures as low as 400°C. Comparing Sample Nos. 14 to 16 which contain $Y_2O_3$, $TiO_2$ and $La_2O_3$ with Sample 13, Samples 14–16 exhibit little or no improvement in the conversion rates of NO and HC (in some cases a decrease is observed) due to the addition of $Y_2O_3$, $TiO_2$ and $La_2O_3$. On the other hand, the addition of the oxides to the Ni-Cu-Cr catalysts promotes a greater CO conversion rate.

In treating exhaust gases with the catalysts of the present invention, no by-production of ammonia in the purification of the exhaust gases was observed. More

TABLE 5

| Sample No. | Catalyst composition (wt %) | | Temperature (°C) and conversion rates (%) Time after commencing the introduction of exhaust gases (second) | | | | |
|---|---|---|---|---|---|---|---|
| | | | 30 | 60 | 120 | 180 | 240 |
| 10 | Ni 70 | Temperature | 250 | 550 | 610 | 610 | 610 |
| | Cu 30 | NO | 24 | 52 | 74 | 75 | 75 |
| | | CO | 34 | 63 | 70 | 70 | 70 |
| | | HC | 12 | 29 | 46 | 50 | 51 |
| 11 | Ni 65 | Temperature | 100 | 390 | 580 | 600 | 600 |
| | Cu 15 | NO | 3 | 32 | 74 | 82 | 85 |
| | Cr 20 | CO | 11 | 54 | 76 | 76 | 75 |
| | | HC | 5 | 21 | 49 | 60 | 65 |
| 12 | Ni 35 | Temperature | 200 | 480 | 600 | 600 | 600 |
| | Cu 25 | NO | 7 | 49 | 80 | 82 | 82 |
| | Cr 40 | CO | 9 | 56 | 65 | 65 | 65 |
| | | HC | 11 | 26 | 48 | 50 | 50 |
| 13 | Ni 65 | Temperature | 100 | 300 | 450 | 450 | 450 |
| | Cu 15 | NO | 0 | 7 | 23 | 37 | 38 |
| | Cr 20 | CO | 5 | 18 | 43 | 45 | 45 |
| | | HC | 7 | 10 | 15 | 16 | 19 |
| 14 | Ni 61.8 | Temperature | 50 | 370 | 510 | 520 | 530 |
| | Cu 14.2 | NO | 1 | 5 | 24 | 40 | 40 |
| | Cr 19 | CO | 9 | 32 | 62 | 69 | 72 |
| | $Y_2O_3$ 5 | HC | 4 | 8 | 16 | 22 | 26 |
| 15 | Ni 61.8 | Temperature | 160 | 360 | 490 | 500 | 500 |
| | Cu 14.2 | NO | 2 | 4 | 17 | 27 | 30 |
| | Cr 19 | CO | 8 | 29 | 49 | 53 | 54 |
| | $TiO_2$ 5 | HC | 3 | 7 | 15 | 20 | 23 |
| 16 | Ni 61.8 | Temperature | 150 | 370 | 520 | 525 | 530 |
| | Cu 14.2 | NO | 0 | 4 | 24 | 28 | 28 |
| | Cr 19 | CO | 8 | 25 | 51 | 64 | 68 |
| | $La_2O_3$ 5 | HC | 4 | 7 | 14 | 21 | 25 |

As can be seen from Table 5, each of the catalysts reaches a substantially stable condition about 120 seconds after the introduction of the exhaust gases. The catalysts of Sample Nos. 10 to 12 over which was passed exhaust gases at 500°C exhibit conversion rates as great as over 50% for NO, CO and HC. The Ni-Cu catalyst (Sample No. 10) exhibits an NO conversion rate as high as 75%, while the catalysts (Samples 11 and 12), in which Cr is added to Ni-Cu, exhibit much greater NO conversion rates on the order of 80 to 85%. These high values reflect the effects of the addition of Cr. Referring now to the case when exhaust gases are introduced to a catalyst at 400°C, the measurements for the conversion activity were conducted under more severe conditions because of the lower gas temperaparticularly, in line with the previously described measurements, the concentration of NO was also measured at point 'X' in FIG. 4 immediately downstream of the catalyst converter. The concentrations of NO were also measured at the inlet of the converter 3 and the outlet of oxidizing tower 4 (as in the Examples). Then, the amount of by-produced ammonia obtained was calculated based on the NO concentration at these three points. Specifically, the NO concentration at point X was used as the value of $V_1$ in the NO-purifying-rate-calculating formula, and the amount of NO which had been decomposed (apparent NO conversion rate) because of the catalyst in the converter 3 was obtained. This apparent NO conversion rate is the sum of the decomposition rate of NO which had been converted into $NH_3$ and the conversion rate (true NO conversion rate) of NO which had been decomposed into $N_2$ and $O_2$ which are harmless. The NO conversion rate obtained from calculation of the NO concentration at the outlet of the oxidizing tower 4 shows the true NO conversion rate as mentioned above. This is because the $NH_3$ by-product is oxidized to NO in the oxidizing tower again. The conversion rate (%) of the ammonia may be obtained by the apparent NO conversion rate less the true NO conversion rate. In the measurements taken in this manner, none of the catalysts of the invention were proved to have accompanied by-production of ammonia. In a comparison of the above catalysts with the conventional platinum catalysts, the catalysts of the present invention are free from ammonia while presenting a high NO conversion rate. An example of this improvement is shown by the comparison in Table 6.

In Table 6, Sample No. 3 is the same catalyst as Sample No. 3 used in Example 2 for the measurement of the conversion rate, while Sample No. $C_3$ represents a conventional platinum catalyst which contains 0.14% by weight platinum on a γ-alumina carrier. The conventional platinum catalyst was prepared by immersing into an aqueous solution containing 0.45% chloroplatinic acid ($H_2PtCl_6—6H_2O$) the carrier of γ-alumina granules having the same volume as the solution. Thereafter the treated granules were removed from solution and heated and reduced in a hydrogen atmosphere. The amount of the catalyst used for the previously described measurements was 20 cc, the temperature of the catalyst was 500°C and the space velocity thereof was 30,000 (1/hr). The exhaust gases used were those from a gasoline engine as used in Example 4.

TABLE 6

| Sample No. | Catalyst composition | | NO conversion rate (%) Air/fuel ratio | | | |
|---|---|---|---|---|---|---|
| | | | 13 | 14 | 14.7 | 15 |
| 3 | 65% Ni-15% Cu-20% Cr | Apparent | 80 | 80 | 72 | 43 |
| | | True | 80 | 78 | 70 | 42 |
| $C_3$ | Platinum | Apparent | 73 | 85 | 90 | 20 |
| | | True | 35 | 50 | 90 | 20 |

As can be seen from the data in Table 6, almost no by-production of ammonia can be found (apparent value less true value of the NO conversion rate) when the catalyst of the present invention is used. On the other hand, a comparison of the apparent and true values for the conventional platinum catalyst reveals a considerably great amount of by-production of ammonia. This is particularly true at high air/fuel ratios. In addition, Sample No. 3 also exhibits a high NO conversion rate even at high air/fuel ratios.

The conversion rate as used herein signifies the true conversion rate, unless otherwise specified.

In summary, the catalysts of the present invention are porous, sintered materials which consist essentially of Ni-Cu particles or Ni-Cu-Cr particles wherein at least a portion of the sintered materials are oxidized. In addition, the catalysts of the invention are free from the by-production of ammonia contrary to the situation when conventional catalysts such as platinum or palladium are used. Further, the present catalysts efficiently convert nitrogen oxides, carbon monoxide and hydrocarbons present in exhaust gases to non-toxic or harmless materials. Particularly, the sintered materials consisting of nickel, copper and chromium particles exhibit high conversion rates for the nitrogen oxides. Furthermore, the catalysts of the invention have substantial strength, because of their structure resulting from sintering of the particles and they exhibit high conversion capabilities per unit volume of gas because of their porous structure.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A catalyst for purifying exhaust gases produced by a process, which comprises the steps of:

mixing particles of nickel and copper; nickel, copper and chromium or nickel; copper, chromium and an oxide selected from the group consisting of yttrium oxide, titanium oxide, lanthanum oxide and mixtures thereof;

sintering said particles at a temperature ranging from 500° to 1000°C in air or an oxygen containing gas which results in partial oxidation of the particles; and activating said sintered mixture at a temperature ranging from 500° to 1000°C under an atmosphere of a reductive gas or a non-oxidizing gas.

2. The catalyst of claim 1 wherein said particulate mixture consists of 50 to 95% by weight of nickel particles and 5 to 50% by weight of copper particles.

3. The catalyst of claim 1 wherein said particulate mixture consists of 50 to 95% by weight of nickel particles and chromium particles and 5 to 50% by weight of copper particles.

4. The catalysts of claim 1 wherein said particulate mixture consists of 95 to 99% by weight of nickel particles, copper particles and chromium particles and 1 to 5% by weight of an oxide selected from the group consisting of yttrium oxide, titanium dioxide, lanthanum oxide and mixtures thereof.

5. The catalyst of claim 1 wherein said catalyst is in the shape of beads, granules, pellets, plates or honeycombs.

6. The catalyst of claim 1, wherein the diameter of said particles ranges from 2μ to 2 mm.

7. The catalyst according to claim 1, wherein said sintered catalyst has a porosity of about 20 to 40%.

8. A method for preparing a catalyst for purifying exhaust gases from internal combustion engines and the like, which comprises the steps of:

mixing particles of nickel and copper; nickel, copper and chromium or nickel, copper, chromium and an oxide selected from the group consisting of yttrium oxide, titanium oxide, lanthanum oxide and mixtures thereof;

sintering said particulate mixture at a temperature ranging from 500° to 1000°C in air or an oxygen containing gas which results in the partial oxidation of said particles; and activating said sintered mixture at a temperature ranging from 500° to 1000°C under an atmosphere of a reductive gas or a non-oxidizing gas.

9. The method of claim 8, wherein said sintered mixture is activated for 1 to 2 hours.

10. A catalyst for purifying exhaust gases produced by a process, which comprises the steps of:

mixing particles of nickel and copper; nickel, copper and chromium or nickel; copper, chromium and an oxide selected from the group consisting of yttrium oxide, titanium oxide, lanthanum oxide and mixtures thereof;

sintering said particles in a non-oxidizing atmosphere;

oxidizing said sintered particles in air or an oxygen containing gas; and activating said sintered mixture at a temperature ranging from 500° to 1000°C under an atmosphere of a reductive gas or a non-oxidizing gas.

11. The catalyst of claim 10, wherein said particulate mixture consists of 50 to 95% by weight of nickel particles and 5 to 50% by weight of copper particles.

12. The catalyst of claim 10, wherein said particulate mixture consists of 50 to 95% by weight of nickel particles and chromium particles and 5 to 50% by weight of copper particles.

13. The catalyst of claim 10, wherein said particulate mixture consists of 95 to 99% by weight of nickel particles, copper particles and chromium particles and 1 to 5% by weight of an oxide selected from the group consisting of yttrium oxide, titanium dioxide, lanthanum oxide and mixtures thereof.

14. The catalyst of claim 10, wherein said catalyst is in the shape of beads, granules, pellets, plates or honeycombs.

15. The catalyst of claim 10, wherein said sintered catalyst has a porosity of about 20 to 40%.

16. The catalyst of claim 10, wherein the diameter of said particles range from $2\mu$ to 2 mm.

17. A method for preparing a catalyst for purifying exhaust gases from internal combustion engines and the like, which comprises the steps of:

mixing particles of nickel and copper; nickel, copper and chromium or nickel, copper, chromium and an oxide selected from the group consisting of yttrium oxide, titanium oxide, lanthanum oxide and mixtures thereof;

sintering said particulate mixture at a temperature ranging from 500° to 1000°C in a non-oxidizing atmosphere;

oxidizing said sintered particles in air or an oxygen-containing gas;

activating said sintered mixture at a temperature ranging from 500° to 1000°C under an atmosphere of a reductive gas or a non-oxidizing gas.

18. The method of claim 17, wherein said sintered mixture is activated at a temperature of 500° to 1000°C for 1 to 2 hours.

* * * * *